UNITED STATES PATENT OFFICE.

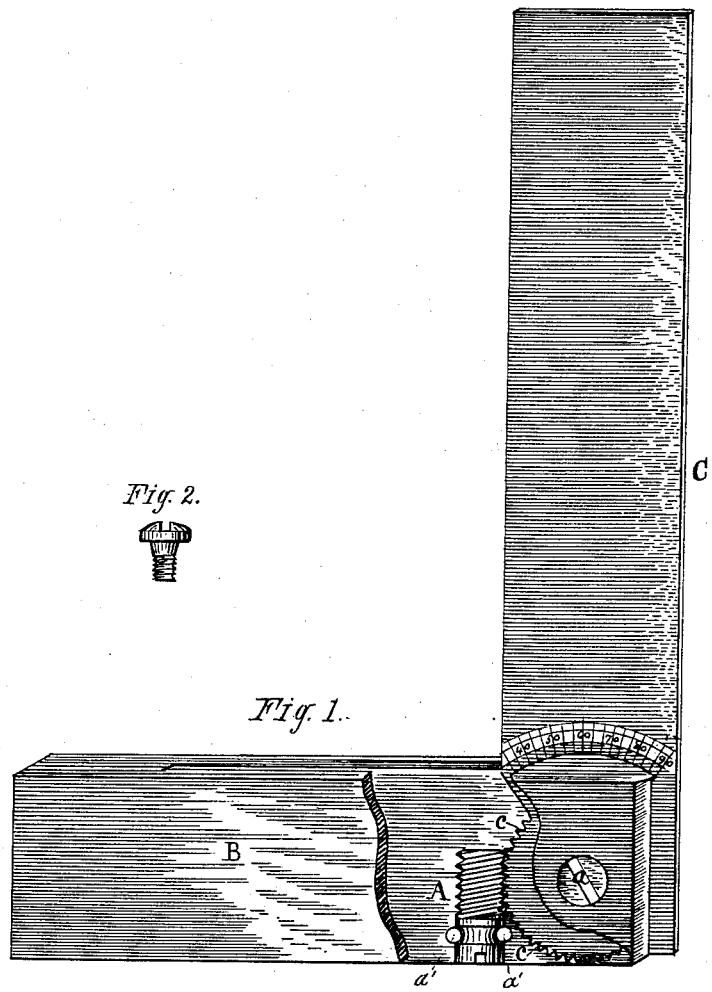

WILLIAM STEERS, OF BRATTLEBOROUGH, VERMONT.

CARPENTER'S SQUARE.

SPECIFICATION forming part of Letters Patent No. 320,718, dated June 23, 1885.

Application filed September 15, 1884. (No model.)

*To all whom it may concern:*

Be it known that I, WILLIAM STEERS, a citizen of the United States, residing at Brattleborough, in the county of Windham and State of Vermont, have invented a new and useful Improvement in Squares, of which the following is a specification, reference being had to the accompanying drawings.

This invention relates to improvements in squares; and it consists in providing on the movable blade at the bottom a toothed quadrant, which is to be worked by an endless or tangent screw, and a set or clamp screw, by which the blade is to be made fast when adjusted at the proper angle, all of which will be hereinafter more fully described, and pointed out in the claim.

In the drawings accompanying and forming part of this specification, Figure 1 is a perspective view of the square having a part of the stock removed to show the toothed quadrant and endless or tangent screw. Fig. 2 is an elevation of the set or clamp screw.

A is an endless or tangent screw secured in the stock B of the square by means of a neck and pins, $a'$ $a'$, in the usual manner.

C is the steel blade of the square, having at its bottom the toothed quadrant $c$. The blade C is pivoted in the slit of the stock B by means of a screw or clamp bolt, $a$. Its shank from the head to the thread is slightly tapering, for the purpose of taking up any "slack" in the quadrant and making the blade steady by the close contact of the teeth with the thread of the screw A. On the blade C is a graduated arc of degrees, properly numbered. The drawings show 90° opposite the corner of the stock B, which corner is the index for the number of the degree which may be required. Any other arrangement may be adopted.

When the blade C is to be moved, the clamp-screw $a$ must be loosened, and then, by turning the endless screw A in the proper direction, the blade can be set at any angle with the greatest exactness. The clamp-screw is then tightened, and the blade will remain securely fastened.

I claim—

The combination of the blade C, having on its face the graduated arc and at its inclosed end a toothed quadrant-rack, the tangent-screw A, entirely inclosed within the stock B, and the tightening-screw $a$, all substantially as and for the purpose described.

In testimony that I claim the foregoing as my own I hereto affix my signature in presence of two witnesses.

WILLIAM STEERS.

Witnesses:
 CLARENCE F. R. JENNE,
 JONATHAN G. EDDY.